INVENTORS.
HARRY H. CHENOWETH
GORDON G. INGMAN
BY
Robert W. Beach
ATTORNEY

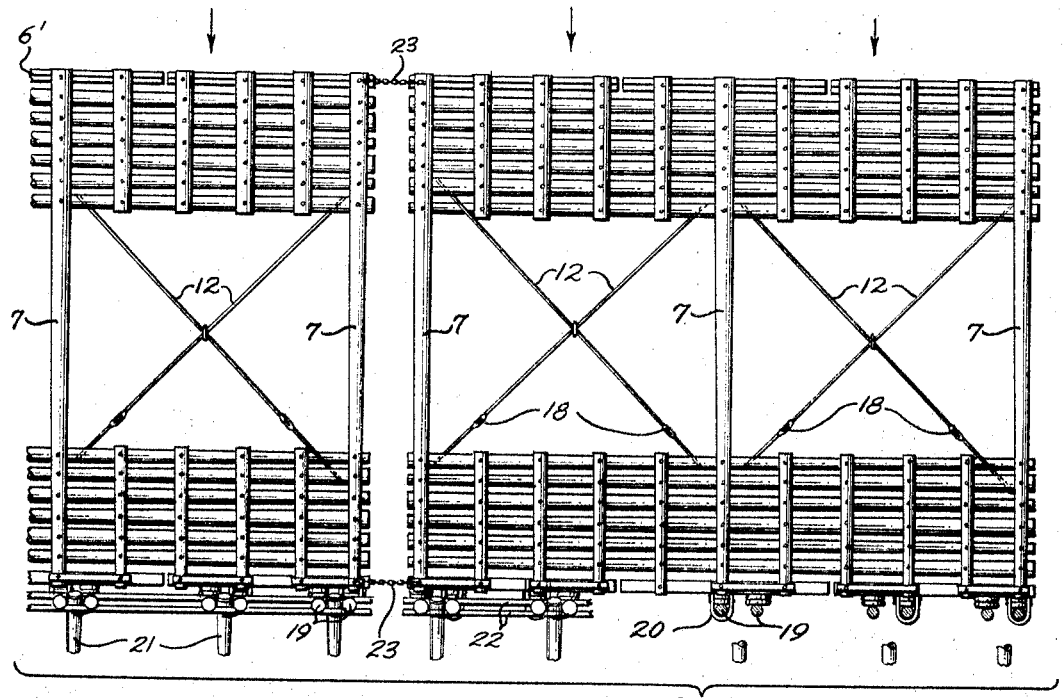
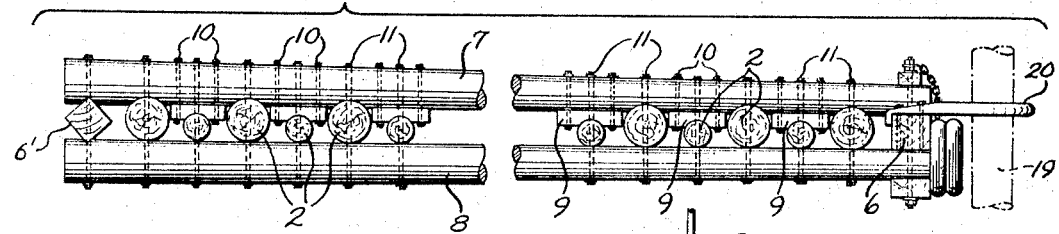
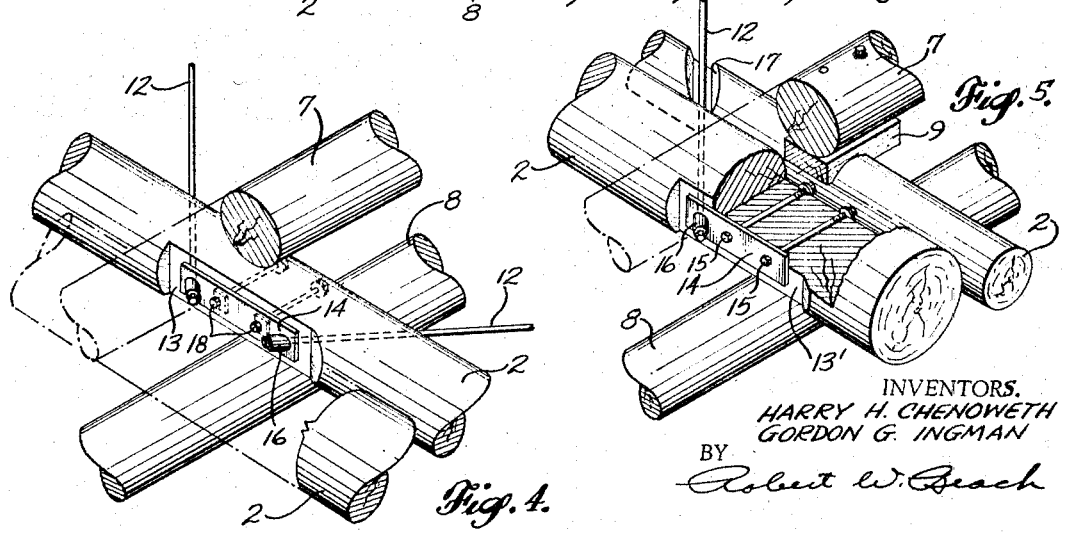
INVENTORS.
HARRY H. CHENOWETH
GORDON G. INGMAN
BY
ATTORNEY

United States Patent Office 3,426,537
Patented Feb. 11, 1969

3,426,537
FLOATING BREAKWATERS
Harry H. Chenoweth and Gordon G. Ingman, Seattle, Wash., assignors, by mesne assignments, to Hill, Ingman, Chase & Co., Seattle, Wash., a corporation of Washington
Filed Nov. 5, 1965, Ser. No. 506,533
U.S. Cl. 61—5                            5 Claims
Int. Cl. E02b 3/06

ABSTRACT OF THE DISCLOSURE

Grids to dissipitate wave energy are composed of a series of substantially parallel elongated members, such as logs, connected positively in substantially parallel, definitely spaced relationship by upper and lower cross members in vertical registry. The elongated members and cross members are secured together by bolts extending through their crossing portions. The width of the grid is a plurality of times as great as its depth and the slots between the elongated members are of substantial width, but at least not appreciably greater than the width of one of such members. A plurality of grid portions are connected together by spaced spreaders to form bays between the grid portions. Tie rods extend diagonally across such bays in crossing relationship.

---

A principal object of the invention is to provide floating breakwater rafts of a type which will be effective to suppress waves, but which can be constructed easily from economical material and which can be fabricated in a wide variety of sizes and arrangements. Particularly such a breakwater can extend effectively over a large area.

It is a further object to provide such a floating breakwater which will remain effective and be durable for extended periods with a minimum of expense for maintenance.

FIGURE 1 is a top perspective of one rigid structural log raft section of the breakwater and FIGURE 2 is a plan of adjacent portions of two adjacent log raft sections which are interconnected. FIGURE 3 is an end elevation of such a log raft section with parts broken away.

FIGURE 4 is a top perspective of a detail of the log raft structure with parts broken away, and FIGURE 5 is a top perspective of a different detail of the log raft structure, parts being broken away.

Figure 1:
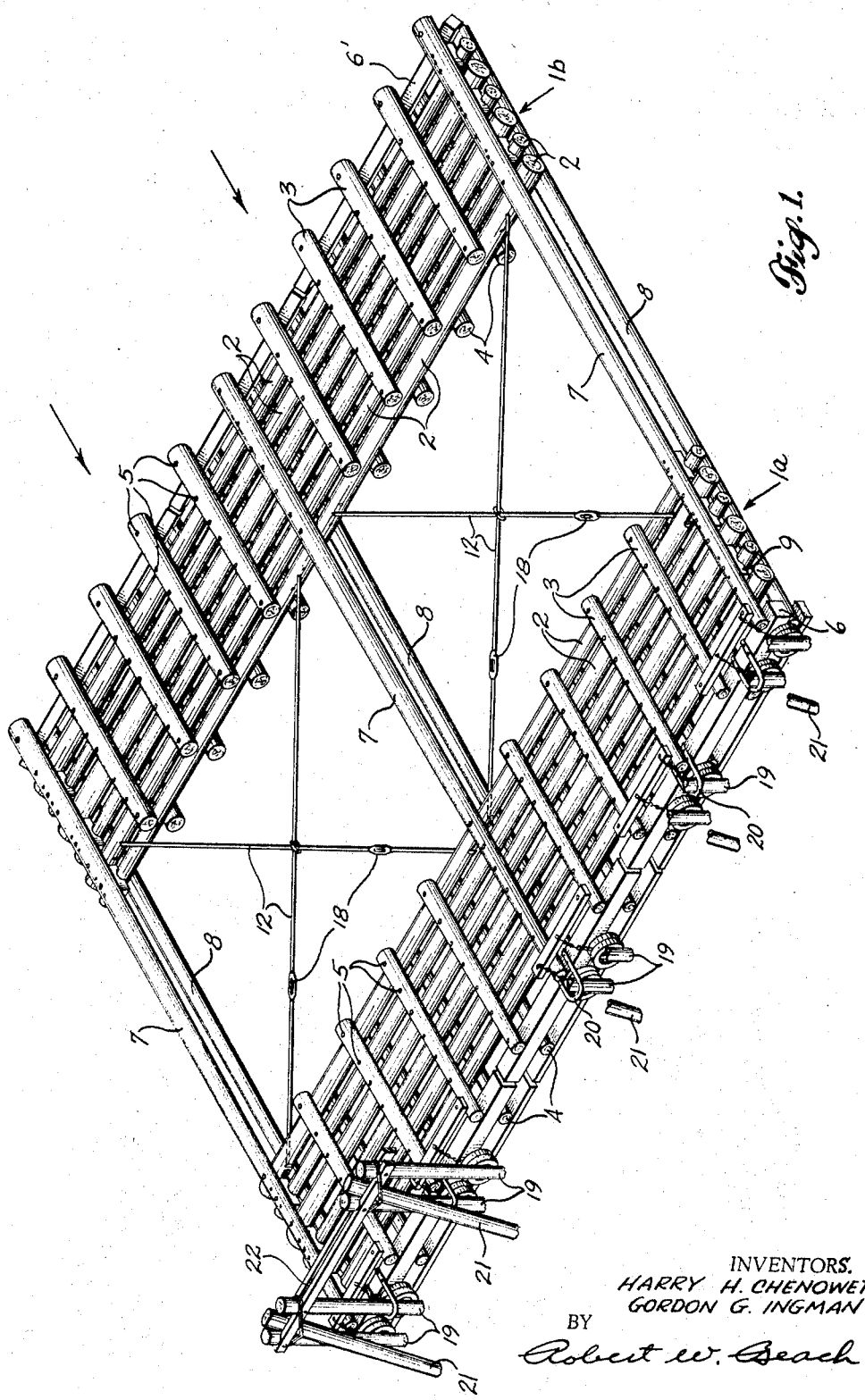

The floating breakwater is composed of any number of sections connected in a line between the location which is to be protected and the region from which waves move. The breakwater sections are rafts constructed of logs which are connected together rigidly to form a unitary structure exceptionally resistant to racking and twisting. Such a raft, shown best in FIGURE 1, includes a plurality of log grids 1a and 1b held in spaced relationship. While only two of such grids are shown additional grids could be included in the raft, if desired. Each of such grids is of elongated shape and includes a series of logs 2 arranged in generally parallel relationship with their lengths extending lengthwise of the grid. Such logs are held in definite closely-spaced substantially parallel relationship forming seats 2' therebetween by upper cross logs 3 and lower cross logs 4, which span between and are connected positively to the longitudinal logs 2 between them by through bolts 5 of a length to extend from the upper side of an upper cross log 3 to the lower side of a lower cross log 4, as shown in FIGURE 3.

In order to make each grid portion of the log rafts of reasonably uniform construction alternate longitudinal logs 2 are reversed end for end, so that the butt of each such log will be adjacent to the tip of the next log. Moreover, it is preferred that all of such logs be of substantially equal diameters, which may average approximately 15 inches in diameter and may vary from a minimum diameter of 10 inches to a maximum diameter of 20 inches. Such grid sections conveniently can be approximately 40 feet in length, although they can be longer or shorter, as desired. Also, each grid may, for example, include six longitudinal logs and these may be secured between upper and lower cross logs spaced apart approximately 4 feet on centers.

By arranging the logs 2 in each grid portion of the raft with the butt and tip ends of adjacent logs disposed oppositely, the spaces or slots 2' between adjacent logs can be of substantially uniform width throughout their lengths, if the logs are secured with their axes in parallel relationship and the tapers of the logs are substantially equal. Such logs can be arranged so that the width of such slots is substantial, such as being at least 5 or 6 inches, but the width of such slots is at least not appreciably greater than the width of the logs 2, as shown in FIGURE 2. The total width of each grid portion 1a or 1b incorporating six logs and a marginal timber 6, may be approximately 10 feet, or about one-quarter of the length of each such grid portion, so as to be of sufficient width to deter substantial roll. Further, it is preferred that the logs 2 be arranged with their lower surfaces substantially coplaner so that each log will be in bearing contact with the intersecting portion of each lower cross log 4.

In each raft section the grid portions 1a and 1b are secured in spaced parallel relationship by parallel upper spreader logs 7 and lower spreader logs 8. The grid portions of the raft should be interconnected by several pairs of such upper and lower spreader logs, three being shown for each section in FIGURES 1 and 2 as being arranged at opposite ends and at the center of the grid portions. Such spreader logs span the space between the grid portions and extend across the grid portions. The lengths of such logs should be equal and will determine the spacing distance between the grid sections. Logs 36 feet in length will provide a spacing between the grid portions 1a and 1b of approximately 16 feet, for example, so that the width between the grids exceeds the width of each grid.

A principal function of the spreader logs 7 and 8 is to tie together the grid portions of the raft structurally in rigid fashion so as to minimize relative racking and twisting movement of the grid portions. Consequently, it is important for each spreader log to have an effective bearing engagement with the upper and lower sides of each longitudinal grid log 2. Moreover, it is desirable to insure that the spacing between such grid logs 2 be established positively without relying completely on the through bolts connecting the longitudinal and cross logs of the grid. Such positive spacing of the longitudinal grid logs and effective upper and lower bearing of the spreader logs 7 and 8 on the longitudinal grid logs is accomplished by the provision of saddle blocks 9, shown in FIGURES 1 and 3, which are of a length to extend between the butt ends of longitudinal grid logs 2 adjacent to opposite sides of the tip of an intermediate log 2.

As has been mentioned previously, the longitudinal grid logs 2 should be arranged with their lower surfaces in coplanar relationship. The butt thicknesses of the logs 2 will establish the spacing between the upper and lower spreader logs 7 and 8 at opposite ends of the grid portion. The butt ends of the logs can be trimmed slightly, as necessary, to provide a direct bearing of the upper and lower spreader logs on the upper and lower sides of each longitudinal grid log butt. Each yoke block 9 should be of a maximum thickness at least as great as the difference between the thickness of the longitudinal grid log tip across which it extends and the spacing between the upper and lower spreader logs. If necessary, the tip of the longitudinal grid log across which the saddle block extends can be trimmed or the saddle block can be hollowed to cradle the log tip so as to provide an effective bearing between the upper and lower spreader logs and the tip ends of the grid logs.

All of the saddle blocks 9 can be secured to the end upper spreader logs 7 by through bolts 10 to constitute spacers for the longitudinal grid log butts adjacent to opposite ends of the saddle blocks and shims for the intermediate longitudinal grid log tips. The upper and lower spreader logs 7 and 8 of each pair can then be secured together with the longitudinal grid logs anchored between them by through bolts 11. The upper and lower spreader logs 7 and 8 arranged between the opposite ends of the raft grid portions can be secured in similar fashion to intermediate portions of the longitudinal grid logs 2. If the intermediate spreader logs are located centrally of the grid portions it will not be necessary to provide shims or saddle blocks because at this location the longitudinal logs should be of approximately equal thickness and any slight unevenness to provide a good bearing can be accomplished with minimum trimming of the log surfaces.

In order to deter racking of the log raft sections by relative movement of the grid portions parallel to their lengths diagonal tie rods 12 extend in crossing relationship across each of the bays formed between the adjacent pairs of spreader logs 7 and 8, as shown in FIGURES 1 and 2. The opposite ends of such tie rods must be anchored securely to the grid portions of the raft sections. Suitable diagonal rod-anchoring structures are shown in FIGURES 4 and 5. In FIGURE 4 an anchor arrangement for the ends of tie rods 12 at opposite sides of a pair of spreader logs 7 and 8 is shown. The side remote from the bays of that longitudinal grid log 2 adjacent to the bays is shown as having been trimmed to provide a flat seat 13 for a bearing plate 14 which is secured on such seat by bolts 15 extending horizontally through the log. Such bearing plate has in its apertures to receive the ends of the tie rods 12 which extend through bores in the log 2 registering with such apertures, and the ends of such tie rods are secured by nuts bearing on collars 16 which in turn bear on plate 14.

The ends of the diagonal tie rods 12 adjacent to the spreader logs 7 and 8 at the ends of the grid portions of the raft can be secured in generally similar fashion, as shown in FIGURE 5. In this instance, while the tie rod end could be secured to the tip portion of a longitudinal grid log, it is preferred to have such tie rod secured to a butt end portion of a grid log. As shown, therefore, the side of a longitudinal grid log butt is trimmed to form the flat seat 13' at the side of such butt remote from a raft section bay and a bearing plate 14 is secured on such seat by bolts 15 extending through the log butt. The end of the tie rod 12 extends through a bore in the butt end of such log and through a notch 17 in the adjacent log tip disposed in registry with the aperture in bearing plate 14 receiving the end of the tie rod. Such tie rod is then secured in place by a nut bearing on the collar 16 which in turn bears on the bearing plate 14.

When the end portions of the diagonal tie rods 12 have been secured to the longitudinal grid logs in the manner described, turnbuckles 18 provided in the tie rods can be turned to tension such tie rods and place the spreader logs 7 and 8 under some compression so as to rigidify the entire log raft section. Swells acting on the log raft section must therefore lift it generally bodily, and while such swells can tilt the section they cannot roll it as a log would roll, nor appreciably rack or twist the section. The effect of such log raft is therefore to suppress such swells to a greater or lesser extent. Chop which contacts such a log raft section will largely be dissipated by projection through the spaces between the logs of the first grid section to be engaged and will be dissipated further by projection through the spaces between the logs of the succeeding grid section or sections so as virtually to dissipate such chop entirely.

To be most effective it is important to moor the log raft sections so that the longitudinal grid logs 2 establishing the lengths of the grids will extend transversely of the direction in which the waves travel toward the moorage or harbor, to intercept them. Such log raft sections should be moored in a manner to enable them to rise and fall with the tide or other change in elevation of the surface of the water, or rise and fall caused by the action of swells on the log raft sections. A row of mooring piles 19 is arranged along one side of the log raft section and such section is secured to at least some of such mooring piles by loops 20 bolted to the edge timber 6 of the raft section. Such mooring piles can be braced by inclined piles 21 and stringers 22 connecting the upper ends of the mooring piles in the row.

As shown in FIGURE 2, adjacent log raft sections of the floating breakwater can be connected by chains 23 at opposite sides, which chains can be boom chains. Any desired number of log raft sections can thus be connected in edge-to-edge relationship across a harbor entrance or in front of a small boat moorage. Also, while the log raft sections shown in FIGURES 1 and 2 are of rectangular shape, the grid portions being of equal length, one grid portion of each log raft section could be made shorter than the other raft section grid portion so that the log raft section would taper. Arrangement of several sections of this type in side-by-side relationship would form a curved breakwater instead of a straight breakwater. Consequently, the principles of the present invention can be utilized in various ways to provide the most effective type of floating breakwater. Also, if desired, each of the grids 1a and 1b could include a plurality of layers of longitudinal grid logs separated by intermediate cross logs suitably bound together by through bolts if a heavier type of log raft section were required to dissipate the waves of rougher waters, but the width of each grid should always be a plurality of times as great as its height, as shown in FIGURE 3, to provide stability against appreciable roll.

The floating breakwater should cover an area of substantial size and the extent of each bay between the parallel grids should be greater than one wave length so that wave crests will not be disposed between both grid sections simultaneously to raise the breakwater bodily. It is preferred that the timber 6' forming the outboard margin of the breakwater be arranged with one diagonal disposed horizontally so that a wave approaching the breakwater in the direction indicated by the arrows in FIGURES 1 and 2 which cannot lift the windward side of the breakwater will be split by a corner of such marginal timber. Consequently part of the wave passes over the windward grid and part passes beneath the grid. The slots 2' between the series of parallel logs 2 of the grid serve as large nozzles because of their venturi shape so that choppy wave crests moving beneath the grid portions of the breakwater will be forced upward through such slots in the form of geysers which will serve to dissipate wave energy. A portion of a wave flowing over the upper side of a grid will create interference with such geysers which will cause further energy dissipating turbulence. Upward movement of water through the grid slots also will produce eddy current beneath the grids which will have an additional energy dissipating effect.

Ideally, therefore, the breakwater will be of sufficiently great extent parallel to the direction of usual wave movement so that the breakwater cannot be raised bodily by a wave or waves or a ground swell although it can rise and fall freely with the tide. Choppy waves are greatly quelled, if not completely dispelled, by energy dissipation resulting from upward and downward surging of water through the slots 2' of the grids, from interference between water flowing in one direction or the other through the grid slots, and water flowing horizontally across such slots and from eddy currents produced both above and below the log grids.

We claim:

1. A floating breakwater comprising a grid having a width at least a plurality of times as great as its vertical depth and including elongated tapered members of generally equal sizes widthwise, disposed in side-by-side relationship and forming a layer which is a single member in depth and in which adjacent members are tapered oppositely, said members being disposed with their central longitudinal axes lying in upright planes which are in generally parallel relationship, a layer of cross members having their lengths extending transversely of the lengths of said elongated members, spanning said layer of elongated members and lying closely adjacent to said layer of elongated members and connecting means positively connecting said crossmember and said individual elongated members adjacent to said cross members at their crossings and holding each elongated member substantially rigidly in relationship spaced at least several inches from the adjacent elongated members on opposite sides thereof but the spacing between adjacent elongated members being not appreciably greater than the width of one of said elongated members, for providing divergent adjacent slots between each elongated member and the adjacent elongated members on opposite sides thereof for wave-dissipating movement of water through such slots.

2. The floating breakwater defined in claim 1, in which the elongated members include logs.

3. The floating breakwater defined in claim 1, in which the elongated members are disposed with their lower sides substantially coplanar.

4. A floating breakwater comprising two grids, each grid having a width at least a plurality of times as great as its vertical depth and including elongated members of generally equal sizes widthwise, disposed in side-by-side relationship with their central longitudinal axes lying in upright planes which are in generally parallel relationship, cross members having their lengths extending transversely of the lengths of said elongated members in both grids, spanning both grids and being connected to said grids to maintain them spaced apart a distance at least substantially as great as the width of one of the grids and connecting means positively connecting said cross members and said individual elongated members adjacent to said cross members at their crossings and holding each elongated member substantially rigidly in relationship spaced at least several inches from the adjacent elongated members on opposite sides thereof but the spacing between adjacent elongated members being not appreciably greater than the width of one of said elongated members, for providing slots between each elongated member and the adjacent elongated members on opposite sides thereof for wave-dissipating movement of water through such slots, two of said cross members spanning both grids and being spaced apart lengthwise of said elongated members of said grids to form a bay between said two grids and said two cross members, and brace means extending across such bay for restraining relative movement of said two grids lengthwise of their elongated members.

5. The floating breakwater defined in claim 4, in which the brace means includes crossed tie members extending respectively diagonally across the bay between the two grids and the two cross members.

References Cited

UNITED STATES PATENTS

| | | | |
|---|---|---|---|
| 1,184,149 | 5/1916 | Thorne | 61—5 |
| Re. 24,837 | 6/1960 | Usab | 61—48 X |
| 162,124 | 4/1875 | Tobey | 9—15 |
| 381,494 | 4/1888 | Durell et al. | 9—15 |
| 607,956 | 7/1898 | Robertson | 9—15 |
| 820,699 | 5/1906 | Butenschon | 9—16 |
| 1,004,718 | 10/1911 | Wieland | 61—5 |
| 1,287,902 | 12/1918 | Cyr | 61—5 |

EARL J. WITMER, *Primary Examiner.*